June 24, 1930. E. O. KEATOR 1,765,837
CABLE CLAMP
Filed Feb. 27, 1929 2 Sheets-Sheet 2
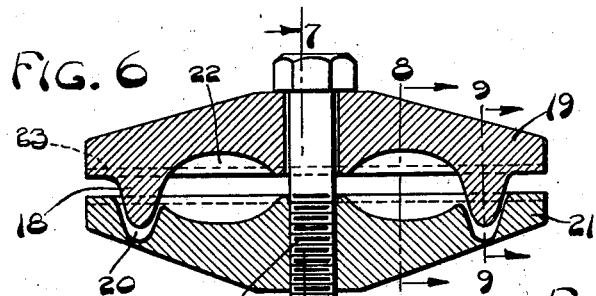
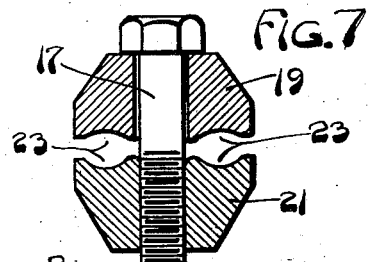
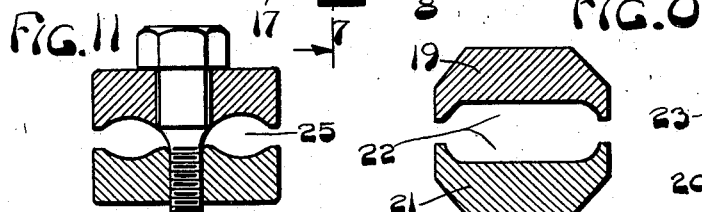
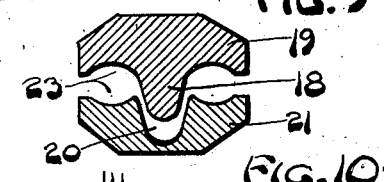
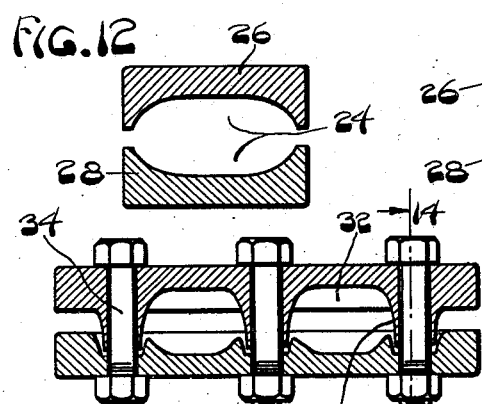
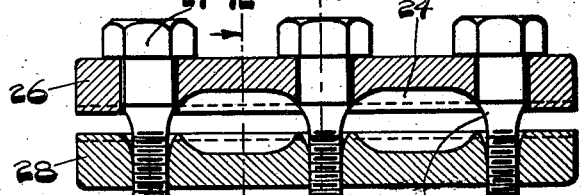
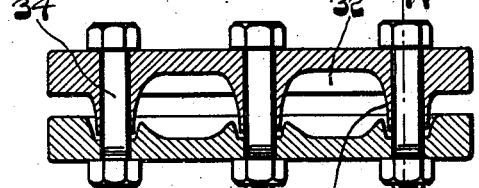
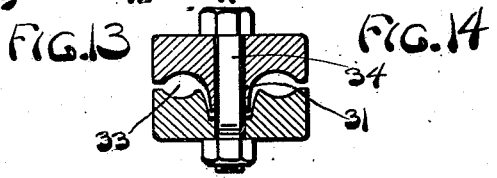
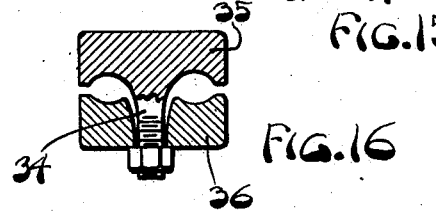
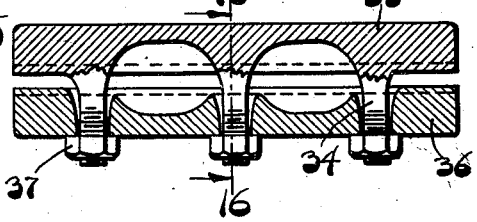
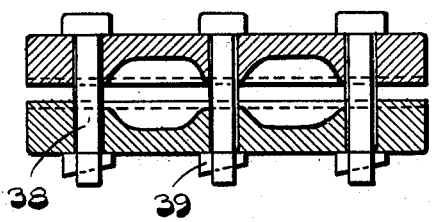
Inventor
Edward O. Keator
By Thornton Rogert
Attorney Patented June 24, 1930

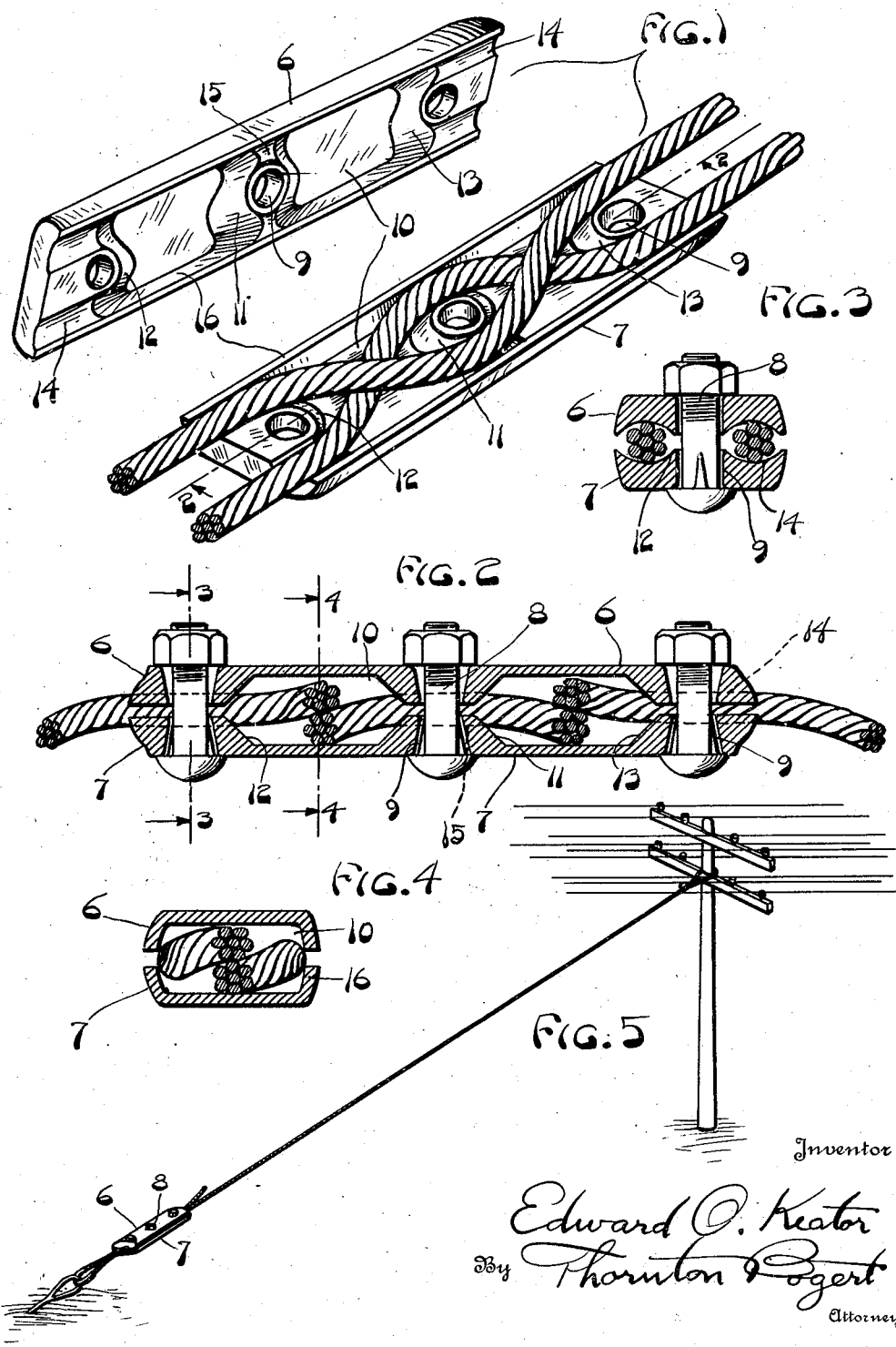

1,765,837

UNITED STATES PATENT OFFICE

EDWARD O. KEATOR, OF DAYTON, OHIO

CABLE CLAMP

Application filed February 27, 1929. Serial No. 343,193.

This invention relates to a rod, wire or cable clamp of improved design, in which an object has been not only to grip cables in the ordinary parallel position, but when desired, much more firmly with less pressure exerted thereon to prevent slippage by an improved manner of placing them in the clamp, thereby increasing the clamp efficiency materially in proportion to its weight and the tension of the clamping bolts, as compared with clamps designed for the same purpose and used heretofore, of equal weight.

In the drawings, Fig. 1 is a perspective view showing the two halves of a clamp embodying my invention in separated condition in order to disclose their formation and the manner in which the cables are placed and held in the clamp for best efficiency.

Fig. 2 is a longitudinal sectional view such as would exist if taken on the line 2—2 of Fig. 1 with the two halves of the clamp together and the bolts in position.

Fig. 3 is a transverse sectional view such as would exist at each of the clamp bolts, as on the line 3—3 of Fig. 2.

Fig. 4 is a transverse sectional view such as would exist at or about the region where the cables cross each other intermediate adjacent bolt locations, as on the line 4—4 of Fig. 2.

Fig. 5 is a perspective view in reduced scale, of a typical installation of clamp embodying my invention, on a guy wire attached to a pole supporting telephone or telegraph wires.

Fig. 6 is a longitudinal sectional view of a modified form of my invention.

Figs. 7, 8 and 9 are respective sectional views taken on the lines 7—7, 8—8 and 9—9 of Fig. 6.

Fig. 10 is a longitudinal sectional view of a further modified form of my invention.

Figs. 11 and 12 are respective sectional views of and taken on the lines 11—11 and 12—12 of Fig. 10.

Fig. 13 is a longitudinal sectional view of another modified form of my invention.

Fig. 14 is a transverse sectional view taken on the line 14—14 of Fig. 13.

Fig. 15 is a longitudinal sectional view of a modification of my invention.

Fig. 16 is a transverse sectional view of the modification shown in Fig. 15, taken on the line 16—16 thereof.

Fig. 17 is a longitudinal sectional view of an additional modification of my invention.

My improved cable clamp is quite simple in that it consists of but two halves 6 and 7 which may be identical in every respect and which may be held together by a series of bolts 8 of usual size, or their mechanical equivalent. Each half of the clamp is formed of a metal casting, rolled, forged, stamped, pressed, or extruded piece in which a series of bolt holes 9, or their equivalent 20, are formed at spaced intervals with regions of depression 10 between the regions of elevation or walls 11, 12 and 13 at the bolt holes.

The regions of elevation are preferably formed to substantial conical shape as shown, in order that certain valuable functionings of the clamp may be accomplished to best advantage in its action on the cables. To each side of the bolt holes are preferably formed grooves in which the cables rest when the clamp halves are drawn tightly upon them. Grooves 14 may be formed at the ends of the clamp halves to serve as guides to locate the cables as they are held in the clamp. Grooves 15 between the ends of the clamp perform the function of retaining parallelly clamped rods or cables intermediate the ends when the clamp halves are drawn tight.

The elevation 11 surrounding the central bolt hole, and the elevations 12 and 13 at each end bolt hole, form V-shaped grooves with the side walls 16 of the clamp halves. The effect of these grooves is to grip the cables in a wedgelike grip if they are forced into them.

In using my improved clamp most advantageously it is but necessary to place the cables in the clamp in the manner shown in Fig. 1. This is easily accomplished in practice, with flexible cable by first assembling the clamp and bolts loosely together and threading the cable between bolts as shown, and, when the cables are tight, by the use of a length of pipe, as a twisting bar, thrust between the two cables after one half of the clamp with the end bolts in position, is placed on the cables. A half twist given the cables by the pipe will bring them to the condition shown, at which time the center bolt, thrust through the center bolt hole of the clamp half and into the pipe, will retain the cables in crossed relation when the pipe is withdrawn. The cooperating half of the clamp is then placed over the bolt ends and clamped upon the cables as shown.

It is this clamping operation which causes the clamp to function most efficiently. First of all the tightening of the bolts forces the cables into the grooves 14 and 15. This creates a tightening action which is also essential in order to enhance the value and efficiency of the second and third functions now to be described. Secondly the crossed cables are forced to occupy the recesses, hollows or depressions 10 in the clamp halves as shown in Figs. 2 and 4, thereby causing the cables to be bent over each other. This produces a snubbing effect of one cable against the other. A third function is produced by this forced bending of the cables over each other. This consists in the pressing of the cables into the V-shaped grooves formed between the regions of elevation and the side walls of the clamp halves, thus bringing about further slip preventative action on the cables.

In the performance of the three functions I have just described, it will be seen that there is produced by this combination a clamp which is capable of the utmost in gripping action with the least possible strain imposed on the bolts to perform the clamping action and with little or no destructive action on the cables themselves, such as chafing, mashing or cutting of the strands.

There is in reality a double snubbing action produced by the action of the cables in being compressed upon each other and in being drawn tight within the clamp upon being subjected to strain. These two important actions consist in first the snubbing of the cables over each other vertically, thus creating a self tightening action, and secondly, in the horizontal snubbing action created by the cables being bent around the bolts as it were, and both enhanced by the initial tightening of the bolts.

In view of the combined vertical and horizontal snubbing thus produced to any degree desired, by my improved clamp, it is obvious therefore that the two features of structural novelty which produce these results are, first, the recessed portions of the clamp, and, second, the elevation surfaces between the recesses. It may be said that this latter feature operates largely by reason of its causing a decreasing size of opening between the two clamp halves which grips the cable tighter in proportion to the pull exerted on it, with the bolts but moderately tight.

Thus due to the double snubbing action I have described, as well as the fact that in reality the cables are not always clamped directly by subjecting them entirely to pressures diametrically opposite each other, whether such pressure be at or in the region of the bolts or at or in the region of depression, hollow or recess where the cables cross each other, the structural strength of the actual clamp in proportion to its gripping efficiency may be materially less than that of the usual clamp for the same purpose. In addition to this, the strain imposed upon the bolts in the clamping operation is materially less than that actually required in such clamps for a given load, therefore materially reducing the danger of stripping bolt threads or other bolt failure due to excessive tightening in an effort to prevent cable slippage. In addition to this, the chafing, crushing or cutting of the cable strands, such as is often experienced in the usual clamp because of the excessive pressure necessitated by the clamp elements upon the cables in order to prevent slippage, is substantially eliminated.

In Figs. 6, 7, 8 and 9 are found longitudinal and transverse views of another form of my improved clamp. Here but one bolt 17 is used for clamping purposes, while lugs 18 at the ends of clamp member 19 cooperate with recesses 20 in clamp member 21 to take the places of and assume the functions of the end bolts and bolt holes of the first described construction. Side channels or grooves 23 are provided for the cables, and recesses or hollows 22 provided for the cables at the points of crossing as in the construction I have described.

In Figs. 10, 11 and 12 is shown a further modified form of my invention. In this form are recesses 24 for the cable crossings, and grooves 25 for the side portions of the cables. One clamp element 26 has holes in it to receive the smooth shanks of the bolts 27, while the other clamp element 28 has threaded openings to receive the threaded ends 29 of the bolts. The bolts are of special shape in that they have tapered or conical portions 30 which take the place of the conical elevations formed on the clamp members of the forms I have described. The functions performed by such a clamp are identical with those described previously.

Figs. 13 and 14 are disclosures of a slight modification in clamp form. This form provides for conical extensions 31 against which the cables bear instead of directly against the bolts as in the form suggested in Figs.

10, 11 and 12. Recesses 32 provide for cable crossings and side grooves 33 for the side portions of the cables as already described.

Figs. 15 and 16 show a form of the invention in which the bolts are formed integrally to form lugs 34 on one member 35 of the clamp, the other member 36 receiving the lugs so as to be drawn into clamping engagement with the cables by nuts 37 on the lugs.

Fig. 17 is merely shown to illustrate the fact that other means than threaded bolts may be employed to create the initial clamping action. The means shown here are a series of unthreaded bolts 38 which at their ends are slotted to receive a series of wedges 39 by means of which the necessary gripping action may be created.

Having thus described my invention, what I claim is:

1. A cable clamp comprising two elements, and means to cause the elements to grip cables between them, each of said elements having recesses at spaced intervals to receive the cables in crossed relation to each other without full contact pressure therewith by the elements at the points of crossing.

2. A cable clamp comprising two elements and a bolt to cause the elements to grip a cable between them, one of said elements having recesses to receive the cable with substantially no gripping contact therewith by the elements, and walls separating the recesses for gripping the cable when the bolt it tightened.

3. A cable clamp comprising two elements, bolts adapted to cause the elements to grip the cables between them, both of said elements having recesses spaced apart to receive the cables and alternating with the bolt holes therein to receive the bolts, and walls separating the bolt holes from the recesses and forming with the walls of the recesses gripping spaces to receive the cables.

4. A cable clamp comprising two elements, and bolts to cause the elements to grip the cables between them, both of said elements having alternating cable-receiving recesses and bolt-receiving holes therein, the walls of the holes separating the holes and the recesses, said walls forming with the walls of the recesses grooves wherein the cables are gripped, said recesses being adapted to receive the cables in crossed relation to each other with incomplete gripping contact of the elements therewith at the points of crossing.

In testimony whereof I have hereunto affixed my signature.

EDWARD O. KEATOR.